United States Patent [19]

Pouliot

[11] Patent Number: 4,549,332
[45] Date of Patent: Oct. 29, 1985

[54] RESTRAINT FOR FLEXIBLE CONDUITS

[76] Inventor: Damien Pouliot, 836 - 14th Ave., Pointe-aux-Trembles, Quebec, Canada, H1B 3T1

[21] Appl. No.: 571,197

[22] Filed: Jan. 16, 1984

[51] Int. Cl.$^4$ .................. A44B 21/00; F16L 35/00
[52] U.S. Cl. .................. 24/335; 24/115 H; 24/129 R; 285/114; 285/117
[58] Field of Search .......... 24/300, 302, 198, 371, 24/115 G, 115 H, 115 K, 136 K, 129 R, 122.6, 335, 339, 338; 285/114, 117; 294/75

[56] References Cited

U.S. PATENT DOCUMENTS

| 378,284 | 2/1888 | Briscoe | 285/117 |
| 532,242 | 1/1895 | McShane | 24/129 R |
| 758,959 | 5/1904 | Crosby | 294/75 |
| 1,529,793 | 3/1925 | Jardine et al. | 285/114 |
| 1,532,549 | 4/1925 | Ransier | 285/114 |
| 1,572,771 | 2/1926 | Connelly | 24/129 R |
| 3,177,542 | 4/1965 | James | 24/335 |
| 3,197,240 | 7/1965 | Lindberg | 24/339 |
| 3,211,473 | 10/1965 | Schmid | 285/114 |
| 3,469,864 | 9/1969 | Guerrero | 24/339 |
| 3,813,733 | 6/1974 | Flohr | 285/117 |
| 4,364,538 | 12/1982 | Tomlinson | 24/115 H |

Primary Examiner—Victor N. Sakran

[57] ABSTRACT

A device used to restrain the flying or whipping of hoses that are accidentally detached while under pressure. The device is formed of a cable halter having slip knot type snares at each of the extremities for engagement about the hoses at a position on both sides of the expected place of separation, a pair of springs forcing the snares to close, so as to obtain a tight engagement with the hoses, and a safety fastener adapted to lock together the hose connectors. The safety fastener is connected to the cable halter by means of a secondary cable, which encircles the hoses to keep the halter cable close to the hoses.

6 Claims, 3 Drawing Figures

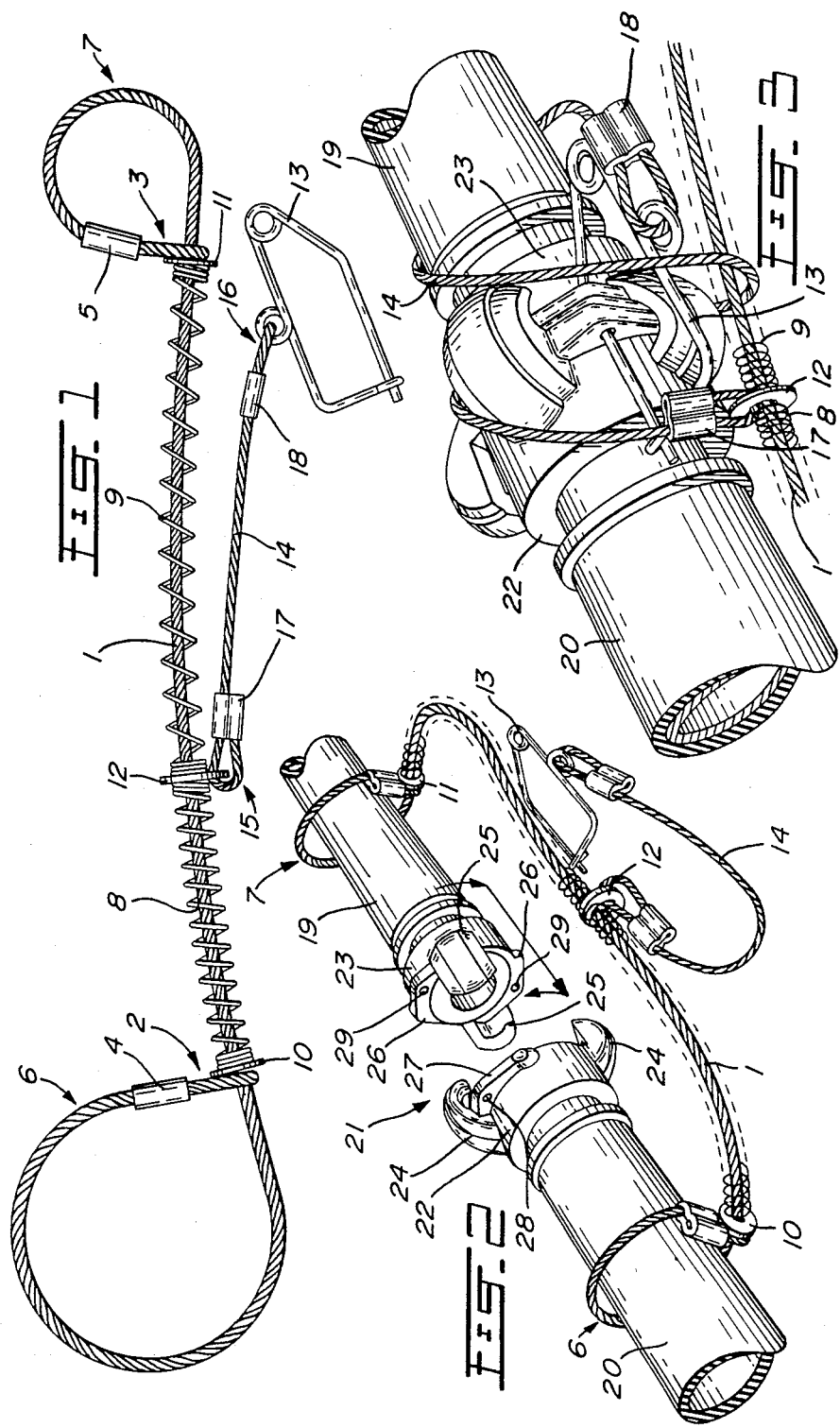

RESTRAINT FOR FLEXIBLE CONDUITS

FIELD OF THE INVENTION

The invention relates to a device used to restrain the flying or whipping of flexible conduits when becoming detached while under pressure.

DESCRIPTION OF THE PRIOR ART

In the order to provide the safer working conditions now required, a number of devices have been developed to restrain the flying or whipping of a flexible conduit. One such device is shown in U.S. Pat. No. 3,859,692 dated Jan. 14, 1975, to Waterman, and comprises a double-strand cable halter forming end loops that are engageable about the conduit on both sides of the quick disconnect connector. In such an arrangement, one end loop often slips off a conduit section when the latter separates, for instance, at one of the connector halves, because the end loops are not held tight enough around the conduit sections. Also, the cable halter is only held to the conduit at its extremities and its loose intermediate portion can cause an accident if someone gets caught therein and trips. Finally, a separate locking device must be used to lock the two halves of the quick disconnect connector.

OBJECTS OF THE INVENTION

It is therefore the main object of the invention to provide a halter cable with slip knot type snares which will positively and firmly tighten around the conduit sections upon their separation.

It is another object of the invention to provide means to secure the halter cable to the conduit at an intermediate point in between its extremities.

It is a further object of the invention to provide a safety fastener attached to the halter cable and engaging the quick disconnect connector halves to lock the same together.

It is a further object of the invention to provide a less expensive security device to restrain the flying or whipping of a flexible conduit.

SUMMARY OF THE INVENTION

A safety device for use in conjunction with separable flow conduits comprising a single strand of material having a non-variable size end loop at each of its extremities, the end loops freely sliding about the strand of material to form opposite variable size main loops for engagement about the flow conduit at a position on both sides of an expected place of separation of the conduit and resilient means acting on the end loops to reduce the opening of the main loops and to allow their installation on conduits of various sizes.

Preferably, a safety fastener is attached to the halter cable by a branch cable; the fastener serves to lock together the two halves of the quick disconnect connector, while the branch cable can be wound around the conduit to keep the halter cable close thereto in an out-of-the-way position.

BRIEF DESCRIPTION OF THE DRAWINGS

FIG. 1 is a top plan view of the invention;

FIG. 2 is a perspective view illustrating the installation of the invention on a flexible conduit; and FIG. 3 is a fragmentary perspective view illustrating the operative position of the safety device of the invention.

DESCRIPTION OF THE PREFERRED EMBODIMENTS

As shown in FIG. 2, the restraint of the invention is formed of a stranded wire 1 ended at both extremities by non-variable size end loops 2 and 3, which are respectively closed by means of cable clamps 4 and 5.

The end loops 2 and 3 are freely sliding about the wire 1 to form variable size main loops 6 and 7.

A pair of compression springs 8 and 9, having a diameter substantially larger than the diameter of the wire 1, surround the wire 1 in between the main loops 6 and 7 and exert a closing force on the latter.

The springs 8 and 9 abut against the loops 2 and 3 with the interposition of rings 10 and 11 and are separated from each other by means of a central ring 12 to which is fastened a safety fastener 13 by means of a branch wire 14. The rings 10, 11, and 12 are all free to slide about the wire 1.

The branch wire 14 comprises non-variable size loops 15 and 16 at its extremities; the loops are respectively closed by the cable clamps 17 and 18 and are respectively engaging the safety fastener 13 and the central ring 12.

FIG. 2 illustrates two hose sections 19 and 20 about to be secured together by means of a quick disconnect connector 21.

The main loops 6 and 7 engage about the hose or flexible conduit sections 19 and 20 beyond complementary connector halves 22 and 23 of the quick disconnect connector 21, the main loops 6 and 7 being automatically initially tightened because of the force exerted by the springs 8 and 9.

The connector halves 22 and 23 respectively conventionally comprise a pair of hook-shaped arms 24 and 25 engaging with corresponding facing flanges 26 and 27. Holes 28 and 29 are pierced on each facing flange 22 and 23 and come in register when the two connector halves are relatively rotated to connected position and, thus holes 28, 29 can receive the safety fastener 13, as shown in FIG. 3.

The branch wire 14 is coiled around the conduit and the halter cable 1 before inserting safety fastener 13 through holes 28, 29. In such an arrangement, the security is increased because the cable 1 is not loose on the ground intermediate its ends and, therefore, cannot cause tripping of a person walking nearby. The branch wire 14 and safety fastener can also be used to secure the conduit to a structure.

In most cases, hose failure occurs at the joint between a flexible hose section 19 or 20 and its rigid connector half 23 or 22. Upon such occurrence, the associated main loops 7 or 6 will not slip off the hose section, because it will immediately become tightened on the hose section independently of the action of springs 8 and 9, the tightening force increasing with the tension exerted by the portion of the cable 1 between the main loops 6 and 7.

A double-flanged sleeve (not shown) is preferably inserted within each end loop 2 and 3 with the end loop tightened on the sleeve by clamp 4, 5 between the two flanges of the sleeve. The latter slidably surrounds wire 1 in order to reduce friction and thus increase the tightening effect of the main loops on the hose sections 19, 20. This sleeve can be made of metal, plastic, such as nylon, or even of wood. This sleeve will also increase the useful life of the safety device.

For certain applications, the branch wire 14 can be eliminated and the fastener 13 directly attached to central ring 12. This induces the user to position the two main loops at the proper places on the hose sections well beyond the respective connector halves 22 and 23.

What I claim is:

1. A safety device for use in conjunction with separable conduits carrying a pressurized fluid, comprising: a single flexible strand of material, each end portion of which is folded about itself and forms a non-variable size end loop, said end loops freely slidable in both directions about said strand of material to form opposite variable size main loops for engagement about said flow conduits at a position on both sides of an expected place of separation of said conduits and resilient means acting on said end loops to reduce the opening of said main loops and to allow their installation on various sizes of conduits.

2. The safety device as defined in claim 1, wherein said resilient means is at least one compression coil spring surrounding the portion of said flexible strand of material intermediate said main loops and pressing against said end loops.

3. The safety device as defined in claim 1, wherein said resilient means consist of two compression coil springs freely surrounding the portion of said flexible strand of material intermediate said main loops in end-to-end relationship and rings freely surrounding said portion and located between the proximate ends of said two coil springs and between the opposite ends of said coil springs and said end loops, respectively.

4. A safety device for use in conjunction with separable pressurized flow conduits, each having and attached to a quick disconnect rigid complementary connector half used to couple said conduits, said connector halves rotatable relative to each other between a connected and a disconnected position, each connector half having a facing flange with a hole, the two holes registering when said connector halves are in connected position, said safety device comprising a single flexible cable having a non-variable size end loop at each of its extremities, said end loops freely slidable about said strand of material to form opposite variable size main loops for engagement of each main loop about one of said flow conduits at a position on both sides of, and spaced from, said connector halves, resilient means acting on said end loops to reduce the opening of said variable size loops and to allow their installation on various sizes of conduits, said safety device further including a safety fastener adapted to removably extend through said registering holes and to lock said connector halves in a connected position, and connecting means connecting said safety fastener to the portion of said cable intermediate said main loops.

5. The safety device as defined in claim 4, wherein said resilient means comprises a pair of compression coil springs freely surrounding the portion of said cable intermediate said main loops and disposed in end-to-end relationship along said portion, rings freely surrounding and slidable along said portion, one ring disposed intermediate said coil springs and the other rings diposed intermediate the respective coil springs and the respective adjacent end loops, said first-named ring forming part of said connecting means.

6. The safety device as defined in claim 5, wherein said connecting means further include an additional flexible cable attached to said safety fastener at one end and to said first-named ring at its other end, and of a length sufficient to be coiled around said flow conduits and said connected connector halves and around said first-named cable.

* * * * *